United States Patent [19]

Zeitlin et al.

[11] 4,076,856
[45] * Feb. 28, 1978

[54] METHYL XANTHINE ANTAGONISM

[75] Inventors: Benjamin R. Zeitlin, Suffern; Alan B. Pritchard, Ithaca, both of N.Y.; Harold S. Levenson, Stamford, Conn.

[73] Assignee: General Foods Corporation, White Plains, N.Y.

[*] Notice: The portion of the term of this patent subsequent to Feb. 8, 1994, has been disclaimed.

[21] Appl. No.: 669,573

[22] Filed: Mar. 23, 1976

Related U.S. Application Data

[63] Continuation-in-part of Ser. No. 431,797, Jan. 9, 1974, Pat. No. 4,007,290, and Ser. No. 511,405, Oct. 2, 1974, abandoned.

[51] Int. Cl.² ............... A23F 1/00; A23F 3/00; A23G 1/00
[52] U.S. Cl. .................. 426/594; 426/595; 426/597; 426/593; 426/72
[58] Field of Search ............ 426/72, 311, 594, 427, 426/595, 428, 597, 593; 260/295.5 R, 295.5 P, 295.5 T, 295.5 B, 295.5 A, 295.5 C, 295.5 D, 295.5 H, 295.5 V, 295.5 S

[56] References Cited

U.S. PATENT DOCUMENTS

| | | | |
|---|---|---|---|
| 2,206,319 | 7/1940 | Geitz, Jr. | 426/311 X |
| 2,340,989 | 2/1944 | Salkin | 426/311 X |
| 2,380,092 | 7/1945 | Weisberg | 426/454 X |
| 3,243,347 | 3/1966 | Kracaver | 426/311 X |
| 3,503,987 | 3/1970 | Kawai | 260/295.5 H |
| 3,536,494 | 10/1970 | Johnson | 426/311 |
| 3,579,356 | 5/1971 | Miller | 426/177 |
| 3,707,382 | 12/1972 | Rostagno | 426/365 |
| 3,875,176 | 4/1975 | Bebenburg | 260/295.5 C |

FOREIGN PATENT DOCUMENTS

| | | | |
|---|---|---|---|
| 190,944 | 7/1957 | Austria | 426/311 |

OTHER PUBLICATIONS

"Determination of Nicotinic Acid in Coffee by Paper Chromatography," by Böddecker and Mishkin, Anylitical Chem., vol. 35, No. 11, Oct. 1963, pp. 1662–1663.
"Studies . . . Monophosphate," by Siggins et al., Brain Research, 25 (1971), pp. 535–553.

Primary Examiner—Frank W. Lutter
Assistant Examiner—Frank Sever
Attorney, Agent, or Firm—Thomas R. Savoie; Daniel J. Donovan

[57] ABSTRACT

Disclosed are methods and compositions for controlling the stimulatory effects of methylxanthines particularly the sleep-disturbing effects of caffeine resulting from consumption of caffeine-containing coffee beverages. This invention eliminates the need for decaffeinating coffee material which is only accomplished with detrimental effects on the coffee. Caffeine antagonists useful either alone or in combination are disclosed herein.

9 Claims, No Drawings

METHYL XANTHINE ANTAGONISM

This application is a continuation-in-part of our prior U.S. patent applications Ser. No. 431,797, filed Jan. 9, 1974, now U.S. Pat. No. 4,007,290 issued Feb. 8, 1977, and Ser. No. 511,405, filed Oct. 2, 1974 and now abandoned.

The invention relates to methylxanthines and compositions containing the same, and, more particularly, to the discovery of an improved manner of controlling the stimulating effects of methylxanthines and compositions useful therefor.

Certain foods and beverages are known to contain significant amounts of methylxanthines. Most prominent among these are coffee, which is known to contain amounts of caffeine sufficient to provide a stimulatory effect; tea, which contains caffeine and theophylline; and cocoa and chocolate, which contain caffeine and theobromine.

The stimulatory effects of the methylxanthines are generally desired. There are, however, uses where suppression or antagonism of the stimulatory effects would be desirable. For example, there are people who enjoy the flavor and aroma of freshly brewed coffee and tea, but who, especially in the evening, find that the desirable stimulatory effects of such beverages have, for them, the undesirable result of sleep disturbance. Additionally, it is desirable, at times, to suppress or antagonize the effects of theobromine which is present in chocolate and cocoa which are consumed, at times, in large quantities by children.

While the unwanted stimulatory effects of caffeine present in coffee and tea can be mitigated by removing the caffeine, even the best commercial decaffeination processes are more costly and detrimental then would be ideal. It is therefore desirable to simplify the procedure for diminishing the stimulatory effects of the caffeine in coffee and tea and also to provide compositions and processes to reduce the stimulatory effects of other methylxanthines, such as theophylline, which may be present therein.

The present invention provides new methods and compositions for antagonizing or suppressing the stimulatory effects of methylxanthines and compositions containing the same.

More specifically, the present invention contemplates the use of certain antagonists for the methylxanthines to control the stimulatory effects to at least partially antagonize the sleep-disturbing characteristics of the methylxanthines, especially in compositions containing methylxanthines.

The methylxanthine antagonists of the present invention are pyridine compounds. Such compounds include a wide variety of substituted pyridines which, of course, should be acceptable for human comsumption, i.e. the pyridine antagonists for the methylxanthines should be non-toxic to humans in the use contemplated, either per se or in the caffeine-containing compositions in which they are employed. Reference in this disclosure and the appended claims to pyridine antagonists for the methylxanthines is always intended to refer to those non-toxic substituted pyridines which at least partially antagonize the sleep-disturbing characteristics of the methylxanthines, especially caffeine.

A wide variety of pyridine compounds are antagonists for the methylxanthines and the effectiveness of any specific pyridine compound can be determined by simple laboratory test procedures which are known to those skilled in the art. For example, the effectiveness of selected candidates can be determined readily by determining the capability of the candidate pyridine compound to counteract the stimulating effect of caffeine. As might be expected, caffeine, alone, results in a highly significant reversal of pentobarbital induced sleep in laboratory animals. Thus, mice are administered sodium pentobarbital, after which they are treated with caffeine alone and together with the pyridine antagonist tested. The measure of sleep time for the mice for control, caffeine-treated and caffeine/antagonist-treated animals is the righting reflex. The time in minutes after the animal receives pentobarbital and, when placed on his back, is unable to right himself is recorded as his loss of righting reflex (asleep). Conversely, the time the animal is able to right himself denotes the regaining of the righting reflex (awake). Calculation of the difference in these times for the various control and treated groups of course provides a measure of caffeine antagonism by the candidate compound. By varying the dosage levels of the candidate pyridine antagonist, the optimum effective levels of the candidate can also be determined.

While a variety of substituted pyridines are found suitable for the presently contemplated use, the preferred compounds are 3-substituted pyridines containing as the 3-substituent such groups as carboxy, carboxamide and hydroxymethyl. 3-substituted pyridines which are metabolic precursors of nicotinic acid have been found especially useful for purposes of this invention. Such compounds can also have other substituents on the pyridine nucleus either the same as or different from the aforesaid substituents. The latter substituents include, for example, alkyl such as methyl and ethyl, hydroxy and alkoxy such as methoxy and ethoxy.

Exemplary preferred pyridine antagonists include nicotinic acid; pyridine-2, 3-dicarboxylic acid (quinolinic acid); nicotinamide; N-methylpyridine-3-carboxylic acid (trigonelline); 3-hydroxymethyl pyridine; and 2-methyl-3-hydroxy-4,5-bis(hydroxymethyl)pyridine (pyridoxine). Also contemplated are the salts of such pyridine compounds with acids such as mineral acids, e.g. hydrochloric acid, and, for those compounds with acid substituents such as carboxy substituents, salts formed with bases such as alkali and alkali metal hydroxides, ammonia and organic amines. In addition, salt formation of the pyridine compounds can also be effected through quaternizing the ring nitrogen with, for example, alkylating agents commonly used for this purpose, e.g. dimethyl sulfate.

These antagonists, either alone or in combination, are employed with a methylxanthine or in a methylxanthine containing composition in an amount effective to at least partially antagonize the stimulatory effects otherwise caused by the methylxanthine. The antagonist can be formulated with the methylxanthine, or in the methylxanthine containing composition, in any suitable manner. Thus, it can be added directly, as part of some other compositional ingredient, or in any other manner. Among the suitable soluble salts of nicotinic acid are the sodium, potassium and calcium salts. It is not essential to the present invention to completely eliminate the stimulatory effects of the methylxanthines. The invention also comtemplates a partial or limited antagonism or suppression.

The most preferred of the pyridine antagonists is nicotinic acid which up to the present has given the best results. Nicotinic acid, as an antagonist for methyl xanthines, can be used alone or in combination with other pyridine antagonists such as, for example, nicotinamide.

A number of methylxanthine containing food products naturally contain finite amounts of certain of the antagonists identified according to the present invention. For example, beverages such as coffee and tea naturally contain identifiable amounts of nicotinic acid. It is therefore contemplated to include within the scope of the present invention any individual and total amounts of the antagonists, above those amounts naturally present in the particular food product, which are effective to at least partially antagonize the stimulatory characteristics of the methylxanthines. It is presently contemplated that the antagonists be employed in the compositions according to the present invention at any therapeutically safe level greater than about 0.5% of the weight of the methylxanthine. The most preferred levels, according to the present contemplation of the invention, are those sufficient to provide the antagonist in an amount within the range of from about 1% to about 500%. The preferred ranges for individual pyridine antagonists vary as might be expected.

The antagonists of the present invention can be employed in any methylxanthine containing food, including concentrates or mixes for preparing such foods. Of special interest are beverages and beverage sources. For the purpose of the present invention, a beverage source is defined as any material which can be dissolved in or extracted with water or aqueous liquid to produce a beverage. Included as beverage sources are roasted and ground coffee, soluble coffee, tea leaves, soluble tea, cola beverage concentrates, chocolate and cocoa beverage concentrates.

Amoung the most notable products containing methylxanthines where the antagonism which is the subject of the present invention would be desirable are beverages such as coffee, tea, cocoa, hot chocolate, cola beverages, and the like. In the exemplary case of coffee, it is noted that coffee beverages are prepared in varying strengths from coffees of varying degrees of roast and with varying types of additives as matters of tradition, local custom and individual taste. As prepared in the United States, a 5½ ounce cup of coffee is typically an aqueous coffee solution containing from about 0.75 gram to about 3.5 grams of soluble coffee solids. As a matter of convenience in definition, and to provide a point of reference, it will be considered that a cup of coffee contains from about 1.5 grams to 2.0 grams of soluble coffee solids. Typically, this amount of coffee solids will contain from about 60 mg to about 150 mg of caffeine.

Because it is known that nicotinic acid is produced during the coffee roasting process by the demethylation of trigonelline, the degree of roast can be conveniently and precisely defined in terms of the natural nicotinic acid content after roasting. Green coffee contains less than about 0.2 mg of nicotinic acid per 10 grams of coffee, and the darkest roast coffees contain no more than about 5 mg of nicotinic acid per 10 grams of coffee. Medium roast coffees contain from about 0.8 mg to about 1.5 mg of natural nicotinic acid per 10 grams of coffee, and are so defined for the purposes of the present invention.

Nicotinic acid is effective in small amounts, and can be employed in the beverage in any effective amount greater than the amount naturally present. The beverage can contain its full natural complement of caffeine or be partially decaffeinated.

According to a preferred embodiment of the present invention, nicotinic acid is employed in coffee in an amount greater than the amount naturally present, which is effective to at least partially antagonize the sleep disturbing characteristics of the caffeine. Thus, for a medium roast coffee the nicotinic acid will be employed at a level sufficient to provide greater than 1.5 mg per cup of coffee beverage as previously defined. Preferably, the nicotinic acid is employed at a level sufficient to provide from greater than 3 mg to 120 mg per cup (equivalent to about 2 to 200% by weight of the caffeine present), and more preferably, from about 6 mg to 50 mg per cup of coffee beverage (4 to 85% by weight of the caffeine present). The most preferred levels, based on a balance of effectiveness and projected commmercial acceptance, are those sufficient to provide nicotinic acid in an amount within the range of from about 10 mg to 30 mg per cup (6.7 to 50% by weight of caffeine). The lower levels of nicotinic acid are more preferred in partially decaffeinated coffee or where a reduced antagonism is desired.

When pyridoxine is employed as an antagonist in the coffee beverage, it should be included in an amount of from 0.6 to 50 milligrams (mg) preferably about 0.6 to 20 mg and typically about 1 to 10 mg per 5½ ounce serving. These amounts correspond to ranges based on the weight of the caffeine present in the coffee material of from about 0.4 to 85%, 0.4 to 33% and 0.6 to 17% respectively.

When trigonelline is employed as an antagonist in the coffee beverage, it should preferably be included in an amount of from 10 to 300, typically about 50 to 240, mg per 5½ ounce serving. These amounts correspond to ranges based on the weight of the caffeine present in the coffee material of from about 7 to 500% and 33 to 400%, respectively.

When quinolinic acid is employed as an antagonist in the coffee beverage, it should be included in an amount of from 0.5 to 200, preferably about 1 to 100 mg and typically about 1 to 10 mg per 5½ ounce serving. These amounts correspond to ranges based on the weight of the caffeine present in the coffee material of from about 0.3 to 330%, 0.6 to 170% and 0.6 to 17%, respectively.

When 3-pyridinemethanol is employed as an antagonist within the coffee beverage, it should be included in an amount of from 1 to 200 mg, preferably about 1 to 100 mg and typically about 1 to 10 mg per 5½ ounce serving. These amounts correspond to ranges based on the weight of the caffeine present in the coffee material of from about 0.6 to 330%, 0.6 to 170% and 0.6 to 17%, respectively.

When nicotinamide is employed, any safe level greater than about 3% of the caffeine can be used. The most preferred levels are from about 9 to 300, preferably about 15 to 120, more preferably about 30 to 90 and most preferably about 45 to 60 mg per 5½ ounce serving. These amounts correspond to ranges based on the caffeine present in the coffee material of from about 6 to 500%, 10 to 200%, 20 to 150%, and 30 to 100%, respectively.

As previously indicated, mixtures of antagonists can be employed. Especially preferred are mixtures of nicotinic acid with other antagonists. Typically, nicotinic acid and a second antagonist are employed together at weight ratios within the range of from about 1:20 to about 20:1, preferably from about 1:10 to about 10:1, and more preferably from about 1:2 to about 8:1.

In like manner with tea, the pyridine antagonists are added to tea to suppress or antagonize its stimulatory effects. Typically in the United States, tea is brewed to a strength which results in a caffeine content of about one-third to about one-half that of coffee. Accordingly, when adding the antagonist to tea the amount should be reduced to about one-third to about one-half of that employed for an equal amount of coffee to obtain a corresponding degree of caffeine antagonism.

For cocoa or chocolate containing compositions, such as hot chocolate, it is the presence of caffeine and theobromine which require the addition of a methylxanthine antagonist according to the present invention. In these compositions, as well as caffeine-containing cola beverages and other like methylxanthine containing compositions, the antagonist is employed in any total antagonist amount which is effective to impart the desired level of antagonism to the composition.

The following examples are present for the purpose of further illustrating and explaining the present invention and are not to be taken as limiting in any sense. Unless otherwise indicated, all parts and percentages are by weight.

EXAMPLE I

Green coffee beans are subjected to a conventional roasting procedure to obtain a medium roast. The roasted beans have a natural nicotinic acid content to about 1.0 mg per 10 grams. While still warm, an aqueous solution of nicotinic acid is sprayed onto the beans in an inert nitrogen atmosphere. The warm, but cooling beans absorb at least a portion of the solution. The cooled beans contain 25 mg of nicotinic acid per 10 grams total weight. The beans are then ground in conventional manner for brewing with hot water to make a coffee beverage wherein the sleep disturbing characteristics of the caffeine are antagonized.

EXAMPLE II

The procedure of Example I is repeated but this time cooling the beans before application of the nicotinic acid solution, and then drying the beans in a vacuum dryer.

EXAMPLE III

A first coffee extract is formed in a commercial percolation process (about 38% yield of soluble solids based on the weight of the roasted coffee) from water decaffeinated robusta coffee. A second extract is formed in similar manner for non-decaffeinated Colombian coffee. A combined extract is prepared by blending 75 parts of the first extract with 25 parts of the second extract and nicotinic acid in an amount equal to 60 mg for each 10 grams of the Colombian coffee beans employed in preparing the second extract. The combined extract is spray dried in conventional manner to yield soluble coffee solids. Dissolved in water, these solids provide a good tasting cup of coffee having diminished sleep disturbing potential.

EXAMPLE IV

The procedure of Example III is again repeated but this time the product is freeze dried.

EXAMPLE V

Nicotinic acid (200 mg) is dissolved in 8 ounces of a commercial, non-dairy coffee lightener. About one ounce of the coffee lightener is then added to a cup of tea prepared by pouring 6 ounces of boiling water into a cup and steeping 1 bag of commercially available tea for two minutes with gentle agitation. The lightened tea contains just about 25 mg of nicotinic acid to antagonize the sleep interrupting properties of the caffeine in the tea.

EXAMPLE VI

Tablets are prepared by co-grinding 5 parts of L-aspartyl-L-phenylalanine methyl ester with 1 part of nicotinic acid and 94 parts of sucrose, and compressing one gram portions of this mixture. One tablet is dropped into a cup of tea prepared as above to yield a sweetened, low-calorie tea drink wherein the sleep interrupting effect of caffeine is significantly antagonized.

EXAMPLE VII

Roasted coffee beans are sprayed with an aqueous solution of nicotinamide while still hot in an inert nitrogen atmosphere, resulting in absorption of a portion of the solution. When evolved, the beans contain about 30 mg of nicotinamide per 10 grams total weight. The beans are then ground in the conventional manner for brewing with hot water to make a beverage wherein the sleep disturbing characteristics of the caffeine are antagonized.

EXAMPLE VIII

A procedure is followed similar to that described in Example VII, but this time a solution of nicotinamide is added to the cooled beans, followed by vacuum or other conventional drying procedure.

EXAMPLE IX

A first coffee extract is formed by a conventional percolation process from roasted, conventionally-decaffeinated robusta coffee. A second extract is formed from non-decaffeinated Columbian coffee. The extracts are combined in proportion of 75 parts of the first with 25 parts of the second and nicotinamide is added in an amount equal to 100 mg for each 10 grams of Columbian coffee beans employed in preparing the second extract. The combined extract is spray dried by conventional means to yield soluble coffee solids. Dissolved or dispersed in water, these solids provide for a good tasting cup of coffee with diminished sleep disturbing potential.

EXAMPLE X

A cola flavored carbonated beverage is prepared in conventional manner, and nicotinamide is dissolved prior to bottling in amounts of 17.5 mgs per 6 fluid ounces to antagonize the caffeine sleep deprivation effect.

EXAMPLE XI

To a commercially prepared coffee extract for making soluble coffee are added 10 mg nicotinic acid and 90 mg of nicotinamide for each 2 grams of coffee solids in the extract. The extract is then spray dried. This soluble coffee contains about 100 mg of caffeine for each 2 grams of soluble coffee solids.

EXAMPLE XII

The procedure of Example XI is repeated, this time employing 20 mg of nicotinic acid and 180 mg of nicotinamide per 2 grams of coffee solids.

EXAMPLE XIII

The procedure of Example XI is again repeated, this time employing 15 mg of nicotinic acid and 15 mg of nicotinamide per 2 grams of coffee solids.

EXAMPLE XIV

The procedure of Example XI is repeated, this time employing 10 mg of nicotinic acid and 50 mg of nicotinamide per 2 grams of coffee solids.

We claim:

1. A composition for preparing a coffee beverage comprising (a) coffee containing caffeine said coffee being selected from the group consisting of roasted coffee, soluble coffee and combinations thereof, and (b) a caffeine antagonist added to said coffee to provide an amount effective to at least partially antagonize the sleep disturbing effects of the caffeine present in the coffee beverage, said antagonist being comprised of (1) nicotinic acid or soluble salt thereof added to said coffee to provide an amount of from about 4% to 85% by weight of the caffeine present and sufficient to provide from about 6 mg to about 50 mg per cup of coffee beverage prepared from said coffee material, wherein a cup of coffee beverage comprises an aqueous solution containing from about 1.5 to 2.0 grams of soluble coffee solids, and (2) a member selected from the group consisting of nicotinamide or a salt thereof added to said coffee to provide an amount of from about 6 to 500% by weight of the caffeine present, trigonelline or a salt thereof added to said coffee to provide an amount of from about 7 to 500% by weight of the caffeine present, pyridine-2, 3-dicarboxylic acid or a salt thereof added to said coffee to provide an amount of from about 0.3 to 330% of the weight of caffeine present, 3-hydroxymethyl pyridine or a salt thereof added to said coffee to provide an amount of from about 0.6 to 330% by weight of the caffeine present and, pyridoxine or salt thereof added to said coffee to provide an amount of from about 0.4 to 85% of the weight of the caffeine present.

2. A composition according to claim 1 wherein the nicotinic acid or soluble salt thereof is present added to said coffee to provide an amount of from 6.7 to 50% by weight of the caffeine present and from about 10 mg. to 30 mg. per cup.

3. A composition according to claim 2 which contains nicotinamide or a salt thereof added to said coffee to provide an amount of from about 30% to 100% by weight of the caffeine present.

4. A composition according to claim 2 which contains trigonelline or a salt thereof added to said coffee to provide an amount of from about 33 to 400% by weight of the caffeine present.

5. A composition according to claim 2 which contains pyridine-2, 3-dicarboxylic acid or a salt thereof added to said coffee to provide an amount of from about 0.6 to 17% by weight of the caffeine present.

6. A composition according to claim 2 which contains 3-hydroxymethyl pyridine or a salt thereof added to said coffee to provide an amount of from about 0.6 to 17% by weight of the caffeine present.

7. A composition according to claim 2 which contains pyridoxine or a salt thereof added to said coffee to provide an amount of from about 0.6 to 17% by weight of the caffeine present.

8. A composition according to claim 1 wherein the coffee is roasted coffee.

9. A composition according to claim 1 wherein the coffee is soluble coffee.

* * * * *